Patented June 9, 1942

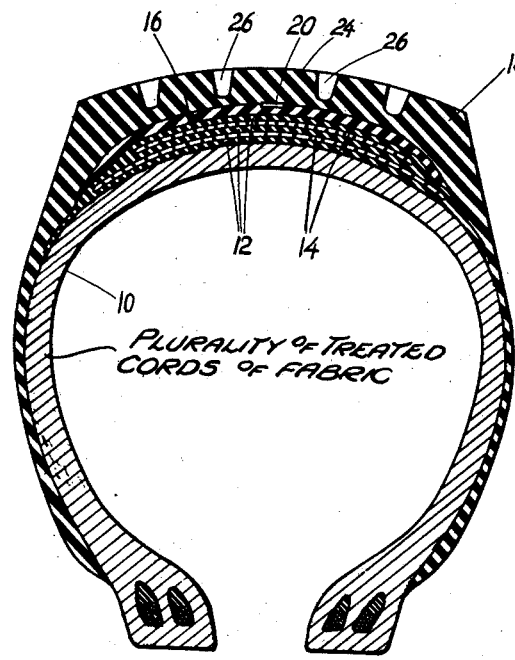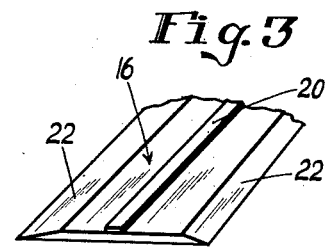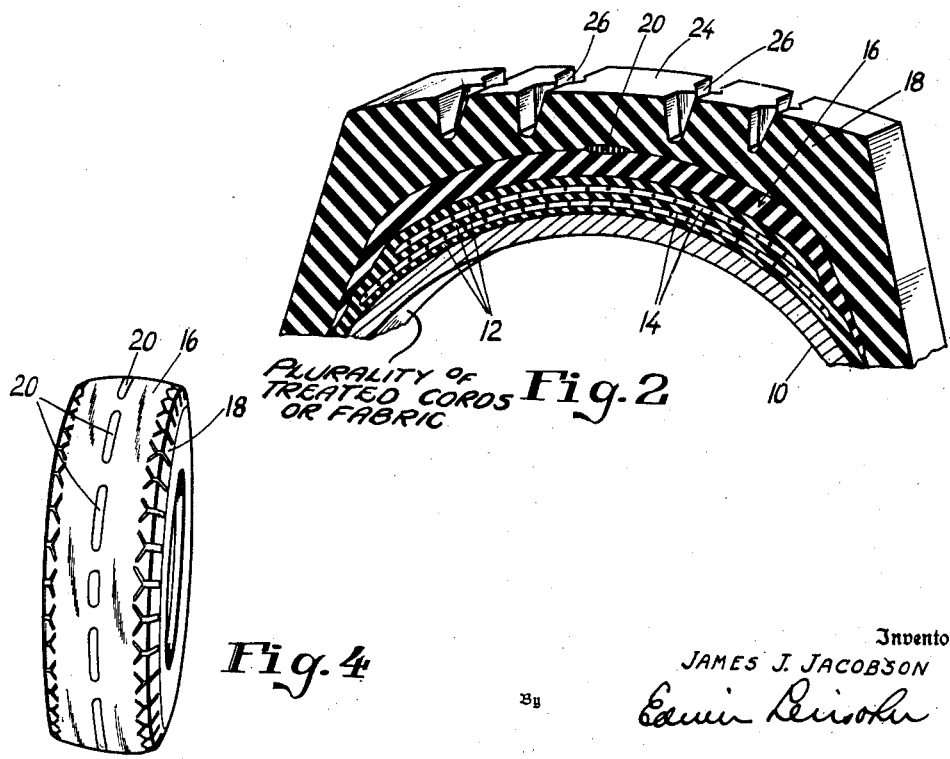

2,285,929

UNITED STATES PATENT OFFICE 2,285,929

PNEUMATIC TIRE

James J. Jacobson, New York, N. Y.

Application March 20, 1939, Serial No. 262,855

9 Claims. (Cl. 152—330)

This invention relates to pneumatic tires and has for its primary object the provision of pneumatic tires constructed so as to enable the same to be recapped in such manner and under such conditions as to assure maximum tire mileage and minimum danger of tire failure or destruction.

In recapping tires, after the tread is worn smooth a new tread or recap is vulcanized on top of the remaining portion of the old tread. In order to obtain maximum mileage from a tire and to guard against destruction or substantial injury thereto which would militate against the success of the recapping thereof, it is important that the recapping be done before excessive wearing away of the protective rubber tread surface over the carcass. For example, in a truck tire, the size of which is 9.75 x 22, it is normally safe to operate the tire until the tread has worn about 17/32's of one inch. Beyond that point the danger zone begins. In a tire of the size just mentioned, there is a thickness of about 4/32's of one inch inwardly of the zone of safe mileage and outwardly beyond the outermost breaker strip which, if the tire is continued in operation without recapping, does not afford proper protection to the carcass. Said rubber thickness of 4/32's of one inch is therefore, the danger zone. On the other hand, if the tire is recapped before wear of the tread substantially beyond 17/32's of one inch in a tire of the size specified or correspondingly in tires of other sizes, there is reasonable assurance that the recapped tire will stand up against normal usage and will be substantially as good as a new tire.

It is not only important, however, to recap the tire before the protective rubber layer over the carcass outwardly of the breaker strip in the danger zone is excessively worn, but it is even more important that the rubber in said zone be in proper condition to provide adequate protection for the carcass. Thus, for example, if the tire is worn down to the danger zone and if in the meantime the rubber in said zone has aged to such an extent as to become excessively hard or brittle, the rubber in said zone even if it has not worn excessively, is in such condition that it does not properly protect the tire against injury and/or deterioration which might be the cause of failure of the tire even if the latter is recapped before excessive wear of the rubber beyond the danger line. In other words, unless the layer of rubber in the danger zone inwardly of the worn tread surface is in proper condition, continued running of the tire is apt to result in injuries thereto resulting in the deterioration of the tire, if not in the immediate failure thereof, even if the tire is recapped before said layer of rubber in the danger zone is excessively reduced in thickness. The deterioration or injuries referred to are likely to be the cause of future tire trouble or failure.

The purpose of the present invention is to so construct the tire that the layer of rubber below the normally worn tread surface will be in such condition as to resist injuries to the tire and thereby prevent deterioration or failure thereof after the tire is recapped. For convenience in reference the layer of rubber in the above mentioned danger zone will be referred to as the under layer or under-skid. This purpose of the invention is accomplished by forming the under-skid of rubber possessing suitable aging properties and in other respects having the same characteristics as the tread portion of the tire. Preferably, and by way of example only, the rubber of the under-skid is such that it ages about one-third more slowly than the rubber of the tread. When the under-skid has this reduced aging property, it is in proper condition at the time the tread is worn to the extent that the tire requires recapping that it is able to resist injury to the tire and to properly protect the carcass thereof. Further the under-skid is at such time in the life of the tire in such condition that it is better able to be revulcanized, that is to accept a second cure, in the process of recapping and therefore provides a proper base for the recapping member or new tread portion.

In view of the above it is apparent that it is important to provide visual means for indicating when the tread has worn to the danger line at the under-skid. For this purpose there is provided, in accordance with the present invention, a tell-tale strip of rubber positioned at the danger line, said tell-tale strip becoming visible when the tread has worn down to the danger line at the under-skid.

The above objects and other objects of the invention and the advantages and features thereof will be more fully understood from the following detailed description, reference being had to the accompanying drawing which is illustrative of the invention but, as will be understood, is not limitative thereof.

In the drawing:

Fig. 1 is a transverse sectional view of a pneumatic tire constructed in accordance with the present invention;

Fig. 2 is a perspective view of a circumferentially extending section of the tire;

Fig. 3 is a fragmentary perspective view of the underskid showing the tell-tale strip associated therewith; and Fig. 4 is a perspective view of a tire constructed in accordance with the present invention, said tire being shown in the worn condition thereof, and shows the exposure of the tell-tale strip which indicates that the tire should be recapped before further substantial running thereof.

Referring now to the drawing in detail, the tire constructed in accordance with the present invention comprises a fabric carcass 10 consisting as usual of a plurality of layers of treated cords or fabric. Said tire is provided also with the usual rubber cushioning strips 12 and with the fabric breaker strips 14. The under layer or under-skid 16, a fragment of which is shown in Fig. 3, is superposed on the outermost cushioning strip 14, and the tread member 18 is superposed over said under-skid and extends as well over the side walls of the tire from bead to bead. The tell-tale member is constituted by a strip 20 which is disposed between the adjacent surfaces of the under-skid 16 and the tread member 18. The under-skid 16 is constituted by a rubber strip which when in the tire extends circumferentially completely therearound. The rubber of which the under-skid is composed is tread rubber but is such that it ages more slowly than the rubber of the tread member 18 but in other respects has preferably substantially the same characteristics as the rubber of the tread. It will be understood that the slower aging property of the under-skid is afforded by the anti-oxidant of the rubber compound. Said under-skid is preferably about 4/32's of one inch in thickness and as clearly shown in Fig. 3 has marginal edge portions 22 of reduced thickness, said edge portions tapering preferably to a thin edge for providing a proper union of the under-skid with the adjacent cushioning strip and with the tread when, as usual, the tire is vulcanized in the mold. As here shown, the voids 26 in the tread member 18 have their bottoms close to the outer surface of the under-skid 16; for example, the bottoms of the voids are about 2/32's of one inch from the adjacent surfaces of the under-skid and tread members. It will be understood, however, that this distance may vary depending upon the depth of the voids and the thickness of the tread member in tires of various sizes.

The tell-tale strip 20 is composed of any suitable rubber, for example rubber of the composition utilized in the cushioning strips 12, and is of a color which contrasts with the color of the tread and under-skid rubber. Said tell-tale strip is about 1/32 of an inch thick and about one-half inch wide and is disposed preferably so that it extends centrally of the center button or rib 24 of the tread between the adjacent series of voids at opposite sides of said button. The tell-tale strip is thus narrow enough to be confined to the line of minimum flexing of the tire whereby the tendency of the rubber layers to separate is substantially eliminated. The central button or rib under which the tell-tale member is positioned preferably extends continuously around the tire and has a minimum width which is greater than the width of said tell-tale member.

Fig. 4 illustrates the tire at the time the tread thereof has been worn away to expose the tell-tale strip 20. In this stage of the wear of the tire the under-skid is exposed as indicated at 16 in Fig. 4 of the drawing. In the ordinary tire as heretofore constructed, without the relatively slow aging under-skid of the present invention the running of the tire after the wear of the tread to the point where the under-skid is exposed involves substantial danger of road failure or destruction of the tire, or at least deterioration thereof by reason of injury to the rubber over the carcass, because by the time the tire has worn down say about 17/32's of an inch in a tire of the size of 9.75 x 22, the remaining tread rubber has aged considerably, becoming hard, brittle and therefore more susceptible to glass cuts, nail holes and other injuries.

In the tire constructed in accordance with the present invention these difficulties and disadvantages are eliminated or greatly reduced, by reason of the provision of the under-skid 16 possessing slow aging properties. On the other hand, after the tire is recapped at the proper time as indicated by the appearance of the tell-tale strip 20, the recapped tire can be run until the cap member is worn down to the under-skid, and as at that time the under-skid has not excessively aged it is in such condition that the tire can be run for the additional mileage provided by the thickness of the under-skid. It will be understood also that by reason of the slow aging properties of the under-skid the latter is in a better condition to be revulcanized during the process of recapping the tire, and said under-skid provides a good base for the application of the recapping member thereto.

The manner in which the maximum mileage of the tire is obtained pursuant to the present invention will be clearly understood from the following example. Assuming that the tread 18 has a thickness of 17/32's of one inch which can be worn down before the tire should be recapped, at 1,500 miles per 1/32 of one inch of wear of tread 18 the tire can be run for 25,500 miles before recapping. After this mileage of the tire has been attained, the danger line is reached, and if the tire is run beyond this line in reliance upon the layer of rubber, in the danger zone, of about 4/32's of one inch in thickness, it is possible to obtain additional mileage of 6,000 miles, which, however, if it can be accomplished at all, is fraught with great danger of injury to the tire and with maximum likelihood of road failure. On the other hand, if the tire is constructed in accordance with the present invention and is recapped pursuant to the latter before substantial wear of the under-skid 16, the total mileage obtainable from the tire including that derived from the recapped tire is about 57,000 miles, including the 6,000 miles available from the under-skid 16. Moreover, as the under-skid 16 is not excessively aged by the time the recapping member has been worn down, the last 6,000 miles which can be derived from the under-skid is considerably less subject to troubles since said under-skid, by reason of its slow aging properties, is in much better condition to resist injury to and deterioration of the tire.

Thus it is seen that the tires constructed as herein described are well adapted to accomplish the objects of the present invention. It will be understood, however, that while I have shown and described the preferred embodiment of the invention, certain changes and modifications will suggest themselves to skilled artisans. It will be understood further that the above dimensions of the parts and size of the tire are merely illustrative and will vary considerably with various tires. Therefore, I do not wish to be limited to the form of the invention herein shown or described, except as may be required by the scope of the appended claims.

Having thus described my invention, what I claim and desire to secure by Letters Patent is:

1. A pneumatic tire comprising a carcass carrying a rubber tread member, and a layer of vulcanized tread-rubber which ages more slowly than the rubber of said tread member disposed between said carcass and said tread member adjacent the inner surface of said tread member, said layer of slower aging rubber extending transversely of the tire from a point at one side of the vertical center line of the tire to a point at the opposite side of said center line.

2. A pneumatic tire comprising a carcass carrying a rubber tread member, a layer of vulcanized tread-rubber which ages more slowly than the rubber of said tread member disposed between said carcass and said tread member adjacent the inner surface of said tread member, said layer of slower aging rubber extending transversely of the tire from a point at one side of the vertical center line of the tire to a point at the opposite side of said center line, said layer being vulcanized to the inner surface of said tread member, and a tell-tale member disposed between the adjacent surfaces of said tread member and said slower aging rubber layer.

3. A pneumatic tire comprising a carcass carrying a rubber tread member, and a layer of vulcanized tread-rubber which ages more slowly than the rubber of said tread member disposed between said carcass and said tread member, said layer of slower aging rubber extending transversely of the tire from a point at one side of the vertical center line of the tire to a point at the opposite side of said center line and vulcanized to the inner surface of said tread member.

4. A pneumatic tire comprising a carcass carrying a rubber tread member, a layer of vulcanized tread-rubber which ages more slowly than the rubber of said tread member disposed between said carcass and said tread member, said layer of slower aging rubber extending transversely of the tire from a point at one side of the vertical center line of the tire to a point at the opposite side of said center line and vulcanized to the inner surface of said tread member, and a tell-tale member disposed between the adjacent surfaces of said tread member and said layer of slower aging rubber layer.

5. A pneumatic tire comprising a carcass carrying a rubber tread member, and a layer of vulcanized tread-rubber which ages more slowly than the rubber of said tread member disposed between said carcass and said tread member, said layer of slower aging rubber extending transversely of the tire from a point at one side of the vertical center line of the tire to a point at the opposite side of said center line, said tread member having voids the bottoms of which lie close to the outer surface of said slower aging rubber layer.

6. A pneumatic tire comprising a carcass carrying a rubber tread member, a layer of vulcanized tread-rubber which ages more slowly than the rubber of said tread member disposed between said carcass and said tread member, said layer of slower aging rubber extending transversely of the tire from a point at one side of the vertical center line of the tire to a point at the opposite side of said center line and vulcanized to the inner surface of said tread member, and a tell-tale member composed of a narrow strip of rubber disposed centrally between the opposite sides of the tire and located between the adjacent surfaces of said tread member and said slower aging rubber layer, said strip of rubber being substantially narrower than said layer of rubber.

7. A pneumatic tire comprising a carcass carrying a rubber tread member, and a layer of vulcanized tread-rubber which ages more slowly than the rubber of said tread member disposed between said carcass and said tread member, said layer of slower aging rubber extending transversely of the tire from a point at one side of the vertical center line of the tire to a point at the opposite side of said center line, said tread member having voids the bottoms of which lie close to the outer surface of said slower aging rubber layer, and a tell-tale member composed of a narrow strip of rubber disposed between the adjacent surfaces of said tread member and said slower aging rubber layer, said strip being disposed centrally of the tire between adjacent series of transversely spaced voids.

8. A pneumatic tire comprising a carcass carrying a rubber tread member having a central circumferentially extending rib and circumferentially extending adjacent series of voids at opposite sides of said central rib providing an anti-skid surface in said tread member, an under layer disposed inwardly of said tread member, said layer being composed of vulcanized tread rubber which ages more slowly than the rubber of said tread member, said layer of slower aging rubber extending transversely of the tire from a point at one side of the vertical center line of the tire to a point at the opposite side of said center line, said layer being vulcanized to the inner surface of said tread member, and a tell-tale member disposed between said tread member and said under layer.

9. A pneumatic tire comprising a carcass carrying a rubber tread member having a central circumferentially extending rib and circumferentially extending adjacent series of voids at opposite sides of said central rib providing an anti-skid surface in said tread member, an under layer disposed inwardly of said tread member, said under layer being composed of vulcanized tread rubber which ages more slowly than the rubber of said tread member, said layer of slower aging rubber extending transversely of the tire from a point at one side of the vertical center line of the tire to a point at the opposite side of said center line, and a tell-tale member disposed between said tread member and said under layer, said tell-tale member comprising a strip of rubber which is narrower than said rib and is positioned between said adjacent series of voids in said tread member.

JAMES J. JACOBSON.